(12) United States Patent
Ye

(10) Patent No.: US 11,856,364 B2
(45) Date of Patent: Dec. 26, 2023

(54) MICROPHONE ARRAY SYSTEM WITH SOUND WIRE INTERFACE AND ELECTRONIC DEVICE

(71) Applicants: ZILLTEK TECHNOLOGY (SHANGHAI) CORP., Shanghai (CN); ZILLTEK TECHNOLOGY CORP., Hsinchu (TW)

(72) Inventor: Jinghua Ye, Shanghai (CN)

(73) Assignee: ZILLTEK TECHNOLOGY CORP., Hsinchu (TW)

( * ) Notice: Subject to any disclaimer, the term of this patent is extended or adjusted under 35 U.S.C. 154(b) by 14 days.

(21) Appl. No.: 17/665,041

(22) Filed: Feb. 4, 2022

(65) Prior Publication Data

US 2023/0043176 A1    Feb. 9, 2023

(30) Foreign Application Priority Data

Aug. 3, 2021 (CN) .......................... 202110888185.4

(51) Int. Cl.
*H04R 1/40* (2006.01)
*H04R 3/00* (2006.01)
*G10L 21/0216* (2013.01)

(52) U.S. Cl.
CPC ............ *H04R 1/406* (2013.01); *H04R 3/005* (2013.01); *G10L 2021/02166* (2013.01); *H04R 2201/401* (2013.01)

(58) Field of Classification Search
CPC .. H04R 1/406; H04R 3/005; H04R 2201/401; G10L 2021/02166
USPC .................................... 381/91, 92, 122, 124
See application file for complete search history.

(56) References Cited

U.S. PATENT DOCUMENTS

| | | | | |
|---|---|---|---|---|
| 2012/0272089 A1* | 10/2012 | Hatfield | .................... | H04J 3/00 713/600 |
| 2013/0108068 A1* | 5/2013 | Poulsen | ................. | H04R 5/033 381/74 |
| 2013/0124763 A1* | 5/2013 | Kessler | ............... | G06F 11/0754 710/110 |

* cited by examiner

*Primary Examiner* — William A Jerez Lora
(74) *Attorney, Agent, or Firm* — Clement Cheng

(57) ABSTRACT

A microphone array system, comprises N microphones, including a first microphone . . . a Nth microphone, wherein N is a natural number greater than 2. Each of the N microphones is provided with: an acoustic transducer for picking up a sound signal and converting the sound signal into an electric signal; a voice activation detector, connected to a corresponding acoustic transducer, and configured to perform a voice activation detection on the electric signal and form an activation signal; a buffer memory, connected to the acoustic transducer, and configured to store a 1/N electric signal of a predetermined segment; a sound wire interface, connected to a corresponding acoustic transducer, the buffer memory, and the voice activation detector, wherein the sound wire interface is connected to an external master chip via a sound wire bus for outputting the activation signal to the external master chip.

9 Claims, 1 Drawing Sheet

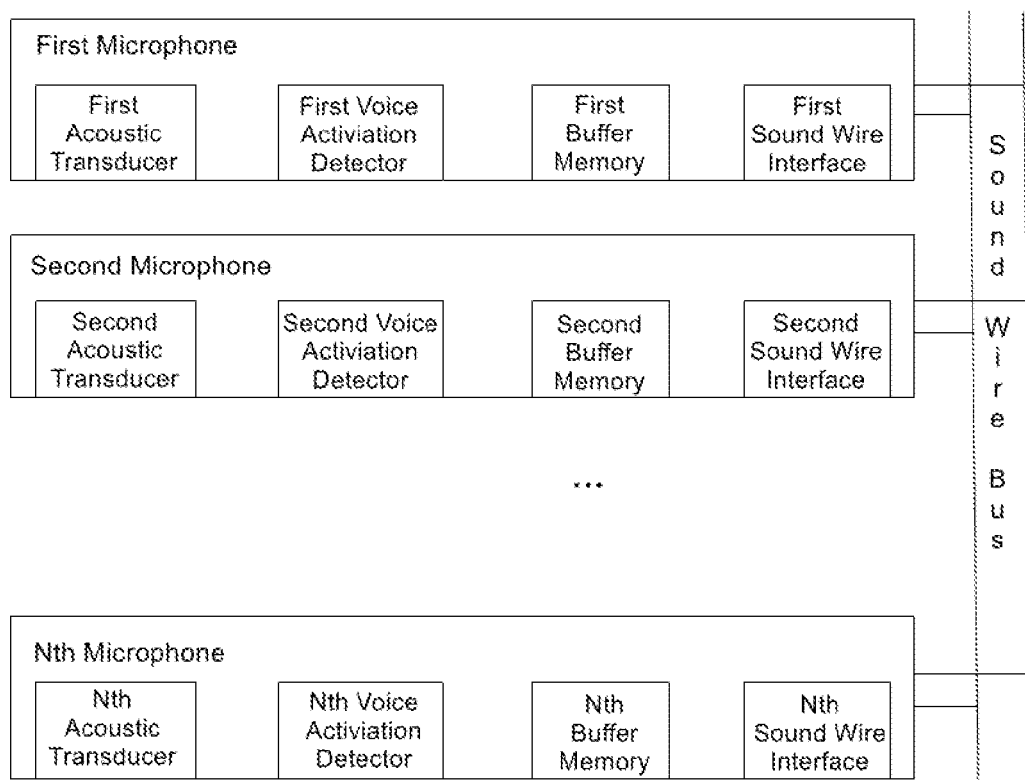

MICROPHONE ARRAY SYSTEM WITH SOUND WIRE INTERFACE AND ELECTRONIC DEVICE

BACKGROUND OF THE INVENTION

1. Field of the Invention

The invention relates to the technical field of microphones, and more particularly, to a microphone array system.

2. Description of the Related Art

A sound wire interface is an audio interface specification, launched by MIPI Alliance, an organization focusing on the research and development of interface specifications for mobile and mobile-related industries. The sound wire interface is suitable for loudspeakers, microphones and audio coders in smart phones, tablets, mobile computers and other devices. It can also connect more microphones to meet urgent, ever-changing and diversified needs in the industry. When compared with the traditional PDM interface that only supports to connect two microphones, the sound wire interface is particularly suitable for a microphone array system equipped with a plurality of microphones. However, the existing microphone array system has a problem of hardware redundancy, which increases its cost and its volume.

SUMMARY OF THE INVENTION

Given that the foregoing problems exist in the prior art, the present invention provides a microphone array system with a sound wire interface.

A microphone array system with a sound wire interface, comprising N microphones, which are a first microphone . . . a Nth microphone, wherein N is a natural number greater than 2, each of the N microphones is provided with:

an acoustic transducer for picking up a sound signal and converting the sound signal into an electric signal;

a voice activation detector, connected to a corresponding acoustic transducer, and configured to perform a voice activation detection on the electric signal and form an activation signal;

a buffer memory, connected to the acoustic transducer, and configured to store a 1/N electric signal of a predetermined segment;

a sound wire interface, connected to the corresponding acoustic transducer, the buffer memory, and the voice activation detector, wherein the sound wire interface is connected to an external master chip via a sound wire bus for outputting the activation signal to the external master chip.

In the microphone array system with the sound wire interface according to the present invention, the buffer memory of the first microphone is recorded as a first buffer memory, the first buffer memory stores a first 1//N electric signal of a predetermined segment, the buffer memory of the Nth microphone is recorded as a Nth buffer memory, the Nth buffer memory stores a Nth 1//N electric signal of a predetermined segment.

In the microphone array system with the sound wire interface according to the present invention, the activation signals output from the voice activation detectors of the N microphones are output via corresponding sound wire interfaces.

In the microphone array system with the sound wire interface according to the present invention, the external master chip reads the electric signal of the predetermined segment stored in the buffer memory of each of the N microphones in sequence, and performs a voice recognition on the electric signal of the predetermined segment.

In the microphone array system with the sound wire interface according to the present invention, an end of the electric signal of the predetermined segment stored in the buffer memory is provided with an end flag bit, upon reading the end flag bit of the buffer memory of each of the N microphones, the external master chip reads the electric signal of the predetermined segment stored in the buffer memory of the subsequent microphone.

In a control method of the microphone array system with the sound wire interface according to the present invention, after receiving the activation signal, the external master chip generates a system wake-up signal, the buffer memory of the microphone concurrently stores the 1/N electric signal of the predetermined segment, collected by the acoustic transducer, in parallel.

The invention further provides an electronic device comprising the microphone array system with the sound wire interface as described above and the external master chip.

In the electronic device according to the present invention, wherein the external master chip reads the electric signal of the predetermined segment stored in the buffer memory of each of the N microphones in sequence, and performs a voice recognition on the electric signal of the predetermined segment.

In the electronic device according to the present invention, upon reading the end flag bit of the buffer memory of each of the N microphones, the external master chip reads the electric signal of the predetermined segment stored in the buffer memory of the subsequent microphone.

By adopting the above-mentioned technical solutions, the present invention has beneficial effects that the buffer memory of each microphone stores a predetermined segment of electric signal, so that memory space of the buffer memory of each microphone can be saved, and costs and volume occupied by a whole system are greatly reduced.

BRIEF DESCRIPTION OF THE DRAWINGS

FIG. 1 is a schematic diagram illustrating a structure of a microphone array system with a sound wire interface according to the present invention.

DETAILED DESCRIPTION

The technical solution set forth in the embodiments of the present invention will now be described clearly and fully hereinafter with reference to the accompanying drawings of the embodiments of the present invention. Obviously, such embodiments provided in the present invention are only part of the embodiments instead of all embodiments. It should be understood that all the other embodiments obtained from the embodiments set forth in the present invention by one skilled in the art without any creative work fall within the scope of the present invention.

Notably, the embodiments set forth in the present invention and features of the embodiments may be combined in any suitable manner The present invention will be described hereinafter with reference to the accompanying drawings and particular embodiments, but the invention is not limited thereto.

With reference to FIG. 1, a microphone array system with a sound wire interface comprises N microphones, which are a first microphone ... a Nth microphone, wherein N is a natural number greater than 2, each of the N microphones is provided with:

an acoustic transducer for picking up a sound signal and converting the sound signal into an electric signal;

a voice activation detector, connected to a corresponding acoustic transducer, and configured to perform a voice activation detection on the electric signal and form an activation signal;

a buffer memory, connected to the acoustic transducer, and configured to store a 1/N electric signal of a predetermined segment;

a sound wire interface, connected to the corresponding acoustic transducer, the buffer memory, and the voice activation detector, wherein the sound wire interface is connected to an external master chip via a sound wire bus for outputting the activation signal to the external master chip.

With reference to FIG. 1, the buffer memory of each of the N microphone (the first microphone ... the Nth microphone) stores an electric signal of a predetermined segment, so that memory space of the buffer memory of each microphone can be saved, and costs and volume occupied by a whole system are greatly reduced. The sound wire bus, as a standard audio bus, supports to connect two or more microphones.

In the microphone array system with the sound wire interface according to the present invention, the buffer memory of the first microphone is recorded as a first buffer memory, the first buffer memory stores a first 1//N electric signal of a predetermined segment, the buffer memory of a second microphone is recorded as a second buffer memory, the second buffer memory stores a second 1//N electric signal of a predetermined segment; the buffer memory of the Nth microphone is recorded as a Nth buffer memory, the Nth buffer memory stores a Nth 1/N electric signal of a predetermined segment.

The present invention fully utilizes each of the buffer memories of the microphone array system to store the 1/N electric signal of the predetermined segment, respectively, so that the problem of hardware redundancy in the microphone array system can be solved, and its cost and its volume can be effectively reduced.

In the microphone array system with the sound wire interface according to the present invention, the activation signals output from the voice activation detectors of the N microphones are output via corresponding sound wire interfaces. The activation signals are transmitted to the master chip via the sound wire bus, and the master chip wakes the system based on the activation signals.

In the microphone array system with the sound wire interface according to the present invention, after the system is woken up, the external master chip reads the electric signal of the predetermined segment stored in the buffer memory of each of the N microphones in sequence, and performs a voice recognition on the electric signal of the predetermined segment.

In the microphone array system with the sound wire interface according to the present invention, an end of the electric signal of the predetermined segment stored in the buffer memory is provided with an end flag bit, upon reading the end flag bit of the buffer memory of each of the N microphones, the external master chip reads the electric signal of the predetermined segment stored in the buffer memory of the subsequent microphone.

In a control method of the microphone array system with the sound wire interface according to the present invention, after receiving the activation signal, the external master chip generates a system wake-up signal, the buffer memory of the microphone concurrently stores the 1/N electric signal of the predetermined segment, collected by the acoustic transducer, in parallel. Due to the fact that there is a time difference between the time when the external master chip receives the activation signal to the time when the system is completely awakened, the invention concurrently stores the electric signal of the predetermined segment before the system is completely awakened, so that the integrity and accuracy of the voice recognition is guaranteed.

The invention further provides an electronic device comprising the microphone array system with the sound wire interface as described above and the external master chip.

In the electronic device according to the present invention, the external master chip reads the electric signal of the predetermined segment stored in the buffer memory of each of the N microphones in sequence, and performs a voice recognition on the electric signal of the predetermined segment.

In the electronic device according to the present invention, upon reading the end flag bit of the buffer memory of each of the N microphones, the external master chip reads the electric signal of the predetermined segment stored in the buffer memory of the subsequent microphone until all the electric signals of predetermined segments stored in the buffer memories of all the microphones are read.

Exemplary embodiments of specific structures for implementations are illustrated with reference to the description and the accompanying drawings. Other conversions can be made based on the spirits of the invention. The above descriptions are only the preferred embodiments of the invention, not thus limiting the embodiments and scope of the invention.

For those skilled in the art, all variations and modifications are obvious from the above description. Thus, the appended claims are to be construed as all the variations and modifications covering all the true intentions and scope of the invention. Any and all the equivalent scope and contents fall within the spirit and scope of the invention.

What is claimed is:

1. A microphone array system with a sound wire interface, comprising N microphones, wherein N is a natural number greater than 2, each of the N microphones is provided with:
    an acoustic transducer for picking up a sound signal and converting the sound signal into an electric signal;
    a voice activation detector, connected to a corresponding acoustic transducer, and configured to perform a voice activation detection on the electric signal and form an activation signal;
    a buffer memory, connected to the acoustic transducer, and configured to store a 1/N predetermined segment of the electric signal;
    a sound wire interface, connected to the corresponding acoustic transducer, the buffer memory, and the voice activation detector, wherein the sound wire interface is connected to an external master chip via a sound wire bus for outputting the activation signal to the external master chip.

2. The microphone array system with the sound wire interface of claim 1, wherein the buffer memory of the first microphone is recorded as a first buffer memory, the first buffer memory stores a first 1//N electric signal of a predetermined segment, the buffer memory of the Nth microphone is recorded as a Nth buffer memory, the Nth buffer memory stores a Nth 1//N electric signal of a predetermined segment.

3. The microphone array system with the sound wire interface of claim 1, wherein the activation signals output from the voice activation detectors of the N microphones are output via corresponding sound wire interfaces.

4. The microphone array system with the sound wire interface of claim 1, wherein the external master chip reads the electric signal of the predetermined segment stored in the buffer memory of each of the N microphones in sequence, and performs a voice recognition on the electric signal of the predetermined segment.

5. The microphone array system with the sound wire interface of claim 4, wherein an end of the electric signal of the predetermined segment stored in the buffer memory is provided with an end flag bit, upon reading the end flag bit of the buffer memory of each of the N microphones, the external master chip reads the electric signal of the predetermined segment stored in the buffer memory of the subsequent microphone.

6. A control method of the microphone array system with the sound wire interface of claim 1, wherein after receiving the activation signal, the external master chip generates a system wake-up signal, the buffer memory of the microphone concurrently stores the 1/N electric signal of the predetermined segment, collected by the acoustic transducer, in parallel.

7. An electronic device comprising the microphone array system with the sound wire interface of claim 1 and the external master chip.

8. The electronic device of claim 7, wherein the external master chip reads the electric signal of the predetermined segment stored in the buffer memory of each of the N microphones in sequence, and performs a voice recognition on the electric signal of the predetermined segment.

9. The electronic device of claim 8, wherein upon reading the end flag bit of the buffer memory of each of the N microphones, the external master chip reads the electric signal of the predetermined segment stored in the buffer memory of the subsequent microphone.

\* \* \* \* \*